A. LITTON.
DEVICE FOR RENOVATING VELVET, RIBBONS, AND THE LIKE.
APPLICATION FILED MAY 17, 1911.

1,005,244.

Patented Oct. 10, 1911.

WITNESSES:
Joseph P. A. Hanlon
John Buckler,

INVENTOR:
Ada Litton

UNITED STATES PATENT OFFICE.

ADA LITTON, OF REVERE, MASSACHUSETTS.

DEVICE FOR RENOVATING VELVET, RIBBONS, AND THE LIKE.

1,005,244. Specification of Letters Patent. Patented Oct. 10, 1911.

Application filed May 17, 1911. Serial No. 627,828.

*To all whom it may concern:*

Be it known that I, ADA LITTON, of Revere, in the county of Suffolk and State of Massachusetts, have invented certain new and useful Improvements in Devices for Renovating Velvet, Ribbons, and the Like, of which the following is a specification.

This invention relates to a device for renovating velvet, ribbons, or the like by means of steam.

The object of the invention is to provide a device of this character, which is primarily intended for household use and is adapted to be supported upon any utensil within the limits of its capacity containing boiling water, thus obviating the necessity of having a particular utensil or other appliance for this purpose.

With the above object in view, the invention consists in the device for renovating velvet, ribbons, and the like, hereinafter described and particularly defined in the claims.

The invention will be readily understood from an inspection of the accompanying drawing, in which—

Figure 1:
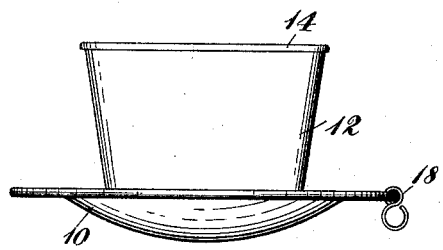
Figure 2:
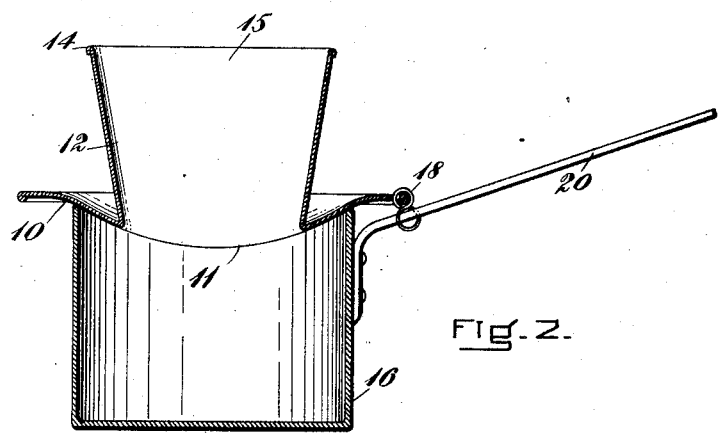
Figure 3:
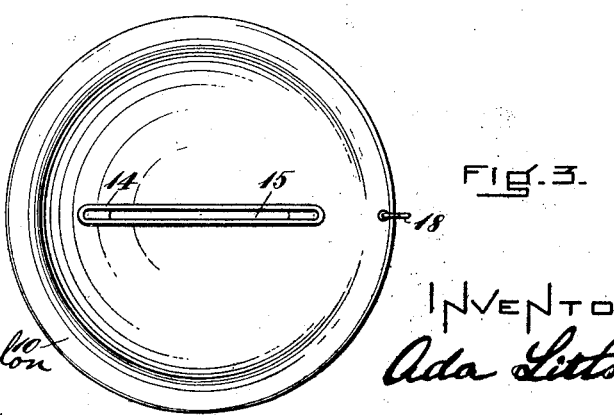

Figure 1 is a side elevation of the device, Fig. 2 is a central, vertical section of the same mounted upon a common cooking utensil, and Fig. 3 is a plan view.

As illustrated in the drawing, the device comprises a support 10, preferably in the form of a shallow, slightly concaved sheet metal pan, which is provided with an elongated slot 11, around the edge of which a flattened tube or conduit 12 is secured. This conduit is preferably flared longitudinally toward the top, and its upper edge is smooth or formed with a rounded bead 14. By this construction a long, narrow slit 15 is provided through which the steam issues.

The support 10 is adapted to rest upon the upper edge of a utensil 16, which may be of any convenient size or shape. For convenience this utensil is shown as a common culinary receptacle, although any other suitable dish may be employed. The support or pan 10 is of such a shape and size as to adapt it for use with a wide variety of receptacles upon which it can be placed.

As is well known, the velvet, or ribbon is drawn back and forth across the smooth upper edge of the conduit, and the steam emanating from the boiling water passes through the conduit and issues from the upper end thereof. The issuing steam passes through the fabric held in contact with the upper edge of the conduit, and by having a smooth, rounded upper edge for the conduit the fabric is in effect ironed smooth as it is drawn back and forth across the same. In some instances it may be found desirable to hold the device on the utensil to prevent its displacement during operation. This may be accomplished by providing an attaching member 18, which may be in the form of a hook, or other detachable device, adapted to engage the handle 20 of the utensil 16.

While I have illustrated and described a preferred embodiment of the invention, I am aware that many modifications can be made therein by any person skilled in the art without departing from the scope of the invention as expressed in the claims. Therefore I do not wish to be limited to all the details of construction shown and described, but

What I claim is:—

1. A device of the character described, comprising a slightly concaved sheet metal support which is provided with a central elongated slot and is adapted to rest upon the upper edge of a receptacle containing boiling water, and a conduit extending upward from said support and surrounding said slot, said conduit having its upper end forming a narrow elongated slit through which steam may issue, substantially as described.

2. A device of the character described, comprising a shallow circular pan adapted to rest upon the upper edge of a receptacle containing boiling water, and provided with an elongated slot extending through the center of the pan, and a conduit fitting said slot and projecting upward from said pan, said conduit flaring longitudinally toward its upper end to provide a narrow elongated slit through which steam may issue, substantially as described.

3. A device of the character described, comprising a slightly concaved sheet metal support which is provided with a central elongated slot and is adapted to rest upon the upper edge of various sizes of receptacles containing boiling water, a conduit extending upward from said support and surrounding said slot, said conduit having its upper end forming a narrow elongated slit through which steam may issue, and an attaching member adapted to engage the handle of a receptacle, substantially as described.

In testimony whereof I have affixed my signature, in presence of two witnesses.

ADA LITTON.

Witnesses:
JOHN BUCKLER,
FRANK G. PARKER.